(12) United States Patent
Das et al.

(10) Patent No.: US 9,832,267 B2
(45) Date of Patent: Nov. 28, 2017

(54) RESOURCE ARBITRATION FOR SHARED-WRITE ACCESS VIA PERSISTENT RESERVATION

(71) Applicant: Microsoft Technology Licensing, LLC, Redmond, WA (US)

(72) Inventors: Rajsekhar Das, Redmond, WA (US); David A. Dion, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 14/255,746

(22) Filed: Apr. 17, 2014

(65) Prior Publication Data

US 2014/0229565 A1 Aug. 14, 2014

Related U.S. Application Data (63) Continuation of application No. 12/233,862, filed on Sep. 19, 2008, now Pat. No. 8,719,473.

(51) Int. Cl.
*G06F 3/06* (2006.01)
*H04L 29/08* (2006.01)
(Continued)

(52) U.S. Cl.
CPC .......... *H04L 67/1097* (2013.01); *G06F 3/067* (2013.01); *G06F 3/0622* (2013.01); *G06F 3/0631* (2013.01); *G06F 3/0659* (2013.01); *G06F 3/0689* (2013.01); *G06F 11/2033* (2013.01); *G06F 11/2046* (2013.01); *G06F 2209/5014* (2013.01)

(58) Field of Classification Search
None
See application file for complete search history.

(56) References Cited

U.S. PATENT DOCUMENTS

| 7,277,952 B2 | 10/2007 | Nishanov et al. |
| 2003/0065782 A1* | 4/2003 | Nishanov ............ G06F 9/5011 709/226 |

(Continued)

FOREIGN PATENT DOCUMENTS

| JP | 2000-222373 A | 8/2000 |
| JP | 2005-534081 A | 11/2005 |

OTHER PUBLICATIONS

"Office Action Issued in Japanese Patent Application No. 2011-527861", dated Aug. 26, 2014, 11 Pages.
(Continued)

*Primary Examiner* — Scott Sun (57) ABSTRACT

Described is a technology by which an owner node in a server cluster maintains ownership of a storage mechanism through a persistent reservation mechanism, while allowing non-owning nodes read and write access to the storage mechanism. An owner node writes a reservation key to a registration table associated with the storage mechanism. Non-owning nodes write a shared key that gives them read and write access. The owner node validates the shared keys against cluster membership data, and preempts (e.g., removes) any key deemed not valid. The owner node also defends ownership against challenges to ownership made by other nodes, so that another node can take over ownership if a (formerly) owning node is unable to defend, e.g., because of a failure.

18 Claims, 6 Drawing Sheets

(51) Int. Cl.
*G06F 11/20* (2006.01)
*G06F 13/38* (2006.01)

(56) References Cited

U.S. PATENT DOCUMENTS

| | | | | |
|---|---|---|---|---|
| 2009/0327798 | A1* | 12/2009 | D'Amato | G06F 3/062 |
| | | | | 714/4.1 |
| 2010/0005318 | A1* | 1/2010 | Hosain | H04L 9/088 |
| | | | | 713/193 |
| 2010/0098248 | A1* | 4/2010 | Anantharaman | G06F 21/6218 |
| | | | | 380/44 |

OTHER PUBLICATIONS

"Third Office Action Received for China Patent Application No. 200980137176.9", dated Sep. 17, 2013, Filed Date: Aug. 19, 2009, 10 Pages.

"Office Action Received for China Patent Application No. 200980137176.9", dated Mar. 17, 2014, Filed Date: Aug. 19, 2009, 15 Pages.

"Office Action Received for Japan Patent Application No. 2011-527861", dated Dec. 10, 2013, Filed Date: Aug. 19, 2009, 18 Pages.

"Final Office Action Issued in Japan Patent Application No. 2011-527861", dated Jan. 6, 2015, 4 Pages.

"Office Action Issued in Chinese Patent Application No. 200980137176.9", dated Mar. 23, 2016, 10 Pages.

"Office Action Issued in European Patent Application No. 09814963.6", dated Oct. 18, 2016, 9 Pages.

"Office Action Issued in Chinese Patent Application No. 200980137176.9", dated Sep. 12, 2016, 18 Pages.

* cited by examiner

FIG. 6 the other servers of the 15 cluster can transparently take over the work of the failed server, that is, restart its applications and thereby continue serving clients without significant interruption. This operation is generally referred to as failover, or failover clustering.

RESOURCE ARBITRATION FOR SHARED-WRITE ACCESS VIA PERSISTENT RESERVATION

CROSS-REFERENCE TO RELATED APPLICATION

The present application is related to U.S. patent application Ser. No. 12/147,956, filed Jun. 27, 2008 and hereby incorporated by reference.

BACKGROUND

A server cluster is generally a group of servers (nodes) arranged such that if any server fails, the other servers of the cluster can transparently take over the work of the failed server, that is, restart its applications and thereby continue serving clients without significant interruption. This operation is generally referred to as failover, or failover clustering.

In a cluster, each storage device (hard disk drive) is owned by one node. The owner node, if properly operating, defends ownership of the storage device against other nodes' challenges for ownership, so that another node can take over ownership if the owner fails.

To implement such a challenge-defense model, a persistent reservations ownership algorithm us used, as described in U.S. Pat. No. 7,277,952. However, this persistent reservations ownership algorithm implements a share-nothing model in which the node owning the disk has exclusive ownership and full access to the disk, while other nodes have read-only access.

One aspect of cluster shared storage volumes technology (described in the related patent application Ser. No. 12/147, 956) is that other healthy cluster nodes need to be able to simultaneously write to shared cluster disks. As a result, a way to grant access of the storage device to healthy nodes, while excluding any nodes that are not properly participating in the cluster, is needed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an owner node in a server cluster exclusively owns a storage mechanism (e.g., disk or other storage device), yet allows non-owning nodes to have shared read and write access to the storage mechanism. In one aspect, one node comprises an owner node that maintains ownership of the storage mechanism through a persistent reservation mechanism that associates (e.g., writes) a key to a registration table associated with the storage mechanism. Non-owning nodes associate a shared key to the registration table. The owner node validates the shared keys against cluster membership data, and preempts (e.g., removes) any key deemed not valid, such that invalid nodes no longer have access to the storage mechanism.

In one aspect, the owner node defends challenges to ownership. A non-owning node writes a challenging key to the storage mechanism, and waits for a defense time. If the owner node is properly operating, it detects the challenging key within the defense time, and preempts it to maintain ownership. If the owner node is not properly operating, the owner node is not able to defend the challenge within the defense time, whereby the challenging node becomes the new owner.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards allowing cluster nodes to share access to disks (e.g., configured as storage volumes) with other nodes, including sharing read and write access. In general, a storage device (alternatively referred to as a "disk" or "hard disk" herein, regardless of whether actually a disk-type storage device) is owned by a single cluster node; however as described herein, the restrictions against read and write I/O operations from other nodes are removed. This allows clustered applications and services running on any node in the cluster to access data on any shared volume.

In one example implementation, such sharing is made possible by allowing nodes to register a SCSI Persistent Reservation (PR) key with an owned disk. More particularly, the owner node registers an exclusive PR key to assert its ownership, and the remaining nodes each register a "shared" PR key, in which is encoded an identifier of that node. In general, a shared PR key for a valid node grants that node read and write access to the disk when owned by another node. If a node that has registered a shared PR key becomes no longer valid (e.g., fails or is otherwise deemed invalid), the owner node purges that node's shared PR key, thus preventing further I/O to the disk from the invalid node.

In one example implementation, this technology works with Microsoft® Windows® Server Failover Clustering using Microsoft® NTFS as a file system, and SCSI disks. However, it is understood that these are only examples. Indeed, other environments, file systems and/or storage technologies may be used to implement one or more aspects of the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, clustering and data access in general.

Figure 1A:
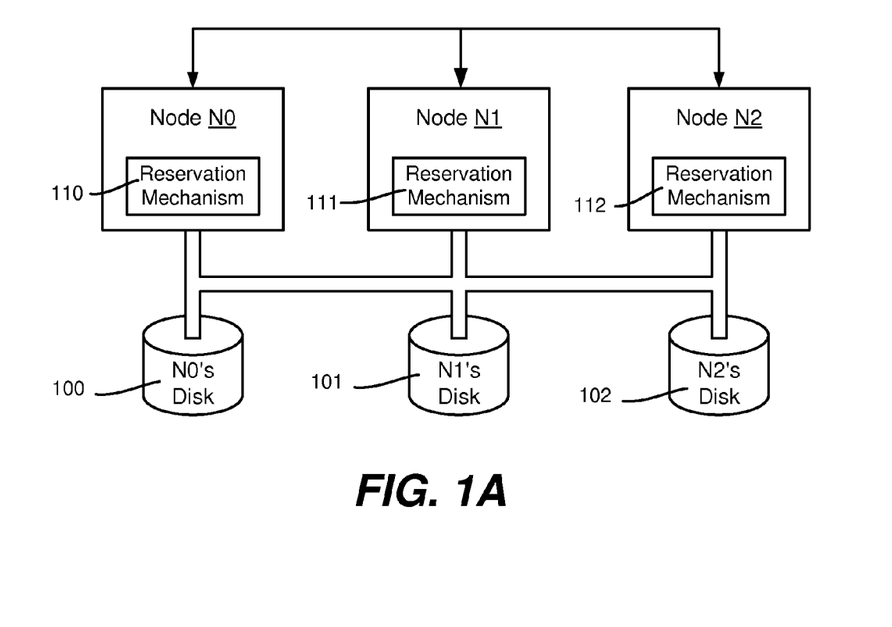
FIGS. 1A and 1B are a block diagrams representing example components in a server clustering environment with shared disks.

Turning to FIG. 1A, there is shown a simplified block diagram of a cluster environment, including three nodes, N0, N1 and N2, each owning a disk 100-102, respectively. Cluster nodes are typically connected to a cluster's disks via SCSI, Fibre Channel, ISCSI or other high-speed communication link.

Figure 1B:
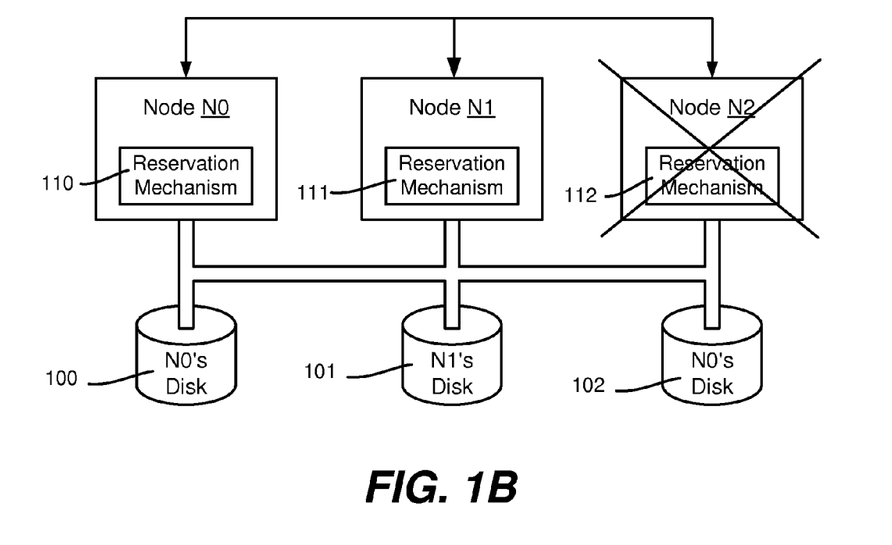

Note that FIG. 1A shows only one possible configuration, as a node may not own a disk, a node may own more than one disk, and so forth. For example, in FIG. 1B, the node N2 has failed (or failed to communicate in some way), whereby the node N0 has also taken ownership of the disk 102 via its reservation mechanism 110, as generally described below. The other nodes N1 and N2 have generally identical reservation mechanisms 111 and 112, respectively.

Figure 2:
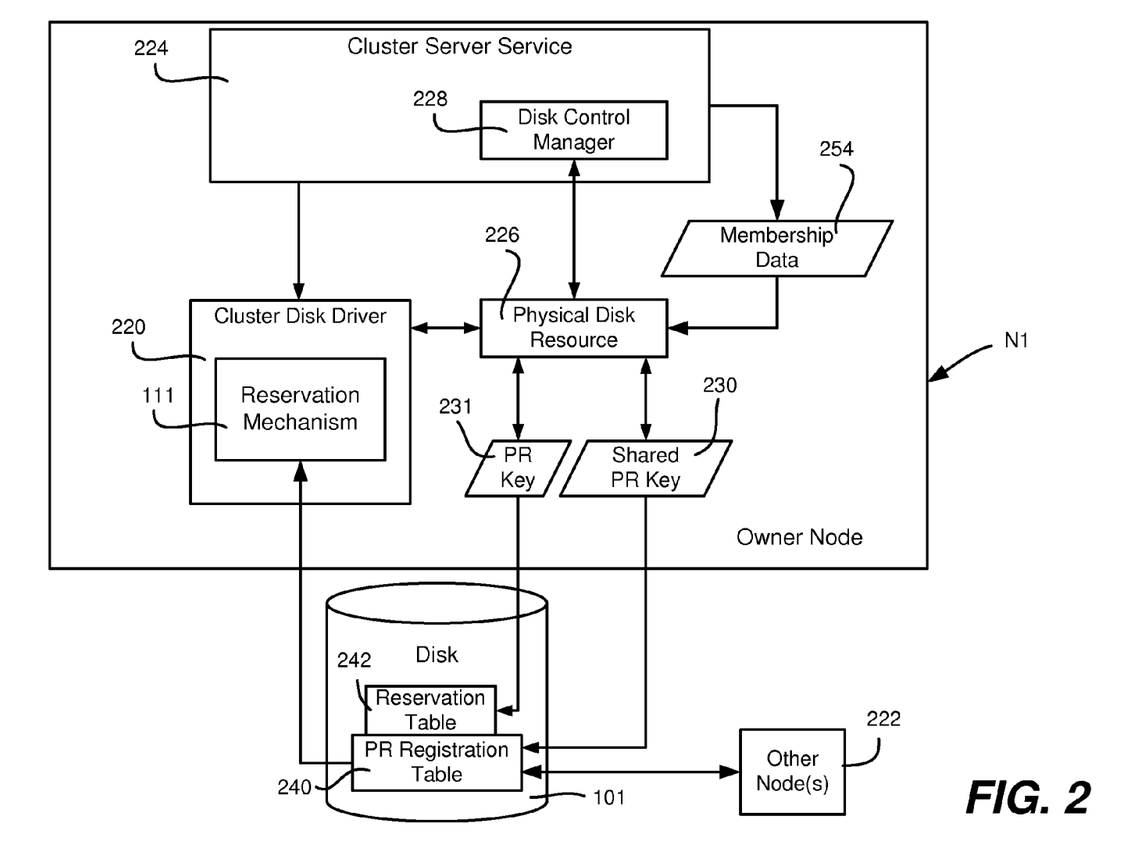
FIG. 2 is a block diagram showing example components for accomplishing resource arbitration and shared-write disk access via persistent reservation.

In order for a node that owns a disk to provide shared access to that disk, an altered reservation scheme that allows concurrent access from multiple cluster nodes is provided. To this end, as generally represented in FIG. 2, each node (such as the node N1) includes a cluster disk driver 220 (e.g., cluster disk.sys comprising a kernel driver) that includes the reservation mechanism 111. As described below, a similar cluster disk driver of another node (e.g., represented by the block 222) participates in a reservation mechanism/algorithm to access the disk 101, while the owning node's cluster disk driver N1 participates in the reservation mechanism/algorithm to maintain and protect ownership. The exemplified cluster disk driver 220 work with a cluster service component 224 as described below.

By way of background, a traditional persistent reservations ownership algorithm, described in U.S. Pat. No. 7,277,952 implements a share-nothing model, that is, the node owning the disk has exclusive ownership and full access, while other nodes have read-only access. The ownership is asserted by the owner node by placing a Write-Exclusive, registrants-only persistent reservation using a reservation key (called the PR key) into the PR reservation table on disk. The owning node maintains/defends this ownership by periodically (e.g., by default every three seconds) checking the PR registration table; other nodes challenge ownership (to take over if the owning node crashes) by registering their own keys in the PR registration table. If the owning node is operational and finds only its own PR key in the table, no action need be taken, however if it finds any key other than its own in the PR registration table, the owning node preempts that key (e.g., removes it from the table; if not operational the challenging node's key remains whereby it takes over ownership by preempting the current's owner's PR reservation with its own). Under a stable and functional cluster, the PR reservation table for a disk has one key, its PR registration table has M keys (all of them from the same owner node) where M is the number of I/O paths to the disk for MPIO systems; for non-MPIO systems M is 1.

For the disks allocated in cluster shared volume, this persistent reservation algorithm is modified as described herein to allow the nodes in the cluster to access the disk in read-write mode, essentially simultaneously, in a safe manner. Machines outside of the cluster do not have access to cluster shared volume disks.

As generally represented in FIG. 2, a physical disk resource 226 manages shared disks in a cluster, and among other actions, ensures that clustered disks are accessed safely and protected from corruption, including facilitating essentially simultaneous access the same shared disks. This is accomplished by using shared persistent reservation (PR) keys, and the knowledge of cluster membership, as described herein.

With respect to the cluster shared volume disk reservation algorithm, in one example implementation, a disk control manager 228 (e.g., of the cluster service 224) calls into the physical disk resource 226 to set up the new reservation policy for a clustered disk 101. More particularly, the clustered disk 101 needs to allow read-write I/O from other nodes, yet without violating the above-described concept of ownership. To this end, the owner node retains control of the disk, but relaxes the I/O policy on a per-node basis, via a shared PR key 230. Under this shared PR key mechanism/reservation algorithm 111, the cluster shared volume disk 101 in an N-node cluster has N*M keys in its registration table 240, where M is the number of I/O paths to the disk from a node in MPIO configuration; for non-MPIO systems, M is one. The owner node has M keys in the registration table 232 and one key, a PR key 231, in a reservation table 242. The tables need not be physically separate and may be kept in any manner, and indeed, the registration table may contain some indication (e.g., a flag or an ordering) as to which of its keys is "in" the reservation table 242 (which thus need not physically exist).

One aspect thus provides an algorithm to control access to a cluster disk, whereby all cluster nodes participating in a cluster have read-write access to that disk. Note that this grants read-write access on a cluster disk to all nodes in the cluster, and, while permitting read-write I/O access to other cluster nodes in good standing, it retains the safety properties of the current algorithm. It also retains liveness and performance properties, as well as the concept that a disk is owned and controlled by at most one cluster node.

As described herein, non-owner nodes insert a shared PR key into the disk PR registration table 240. The shared key is not shared by all nodes; rather, it represents that the node inserting this key shares read-write access to the disk 101 with other nodes. An identifier (id) of the node that inserted the key is encoded in the key. Thus, a disk 101 arbitrated by this algorithm in an N-node cluster will have N shared PR keys in its registration table 240. In one implementation, the first key is the exclusive (PR) key 231 inserted by the owner node. The remaining N−1 keys are shared PR keys inserted by non-owner nodes.

The owning node periodically queries the PR registration table 240 to evaluate the keys. If a key is a shared key, the owner extracts from the key the id of the node that inserted the key. If the node is valid (is in "good standing" in the cluster), the owner allows the key to remain in the registration table 240. If the node is not in good standing, the owner preempts the key, thus removing it from the registration table 240.

If the key is not a shared key, then ownership has been challenged. The owner preempts such a key, thus removing it from the registration table 240.

Figure 3:
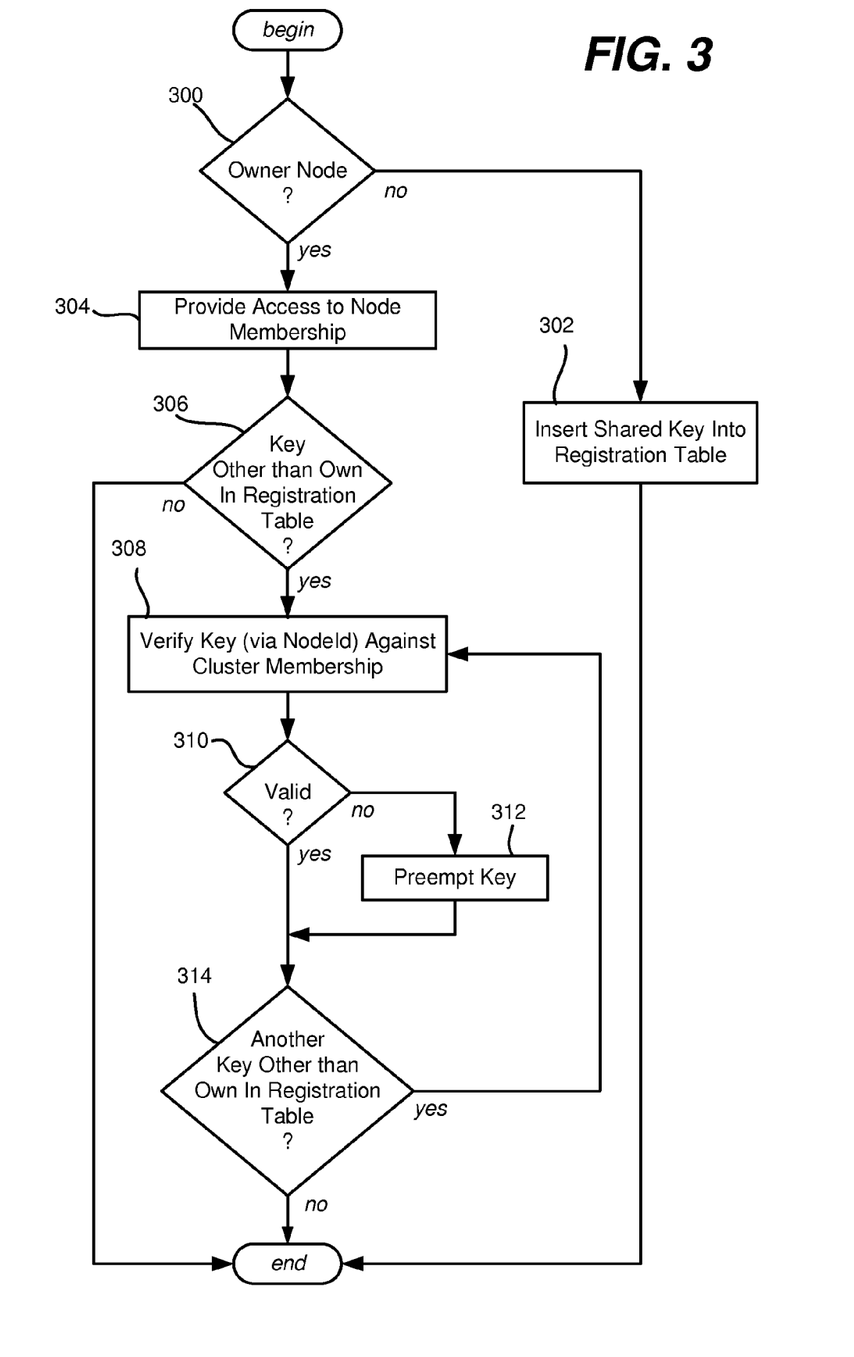
FIG. 3 is a flow diagram showing example steps taken to reserve and/or access a cluster shared volume.

FIG. 3 is a general flow diagram showing example steps of one such algorithm as implemented via the exemplified components of FIG. 2, for example. For any non-owner nodes such as represented via step 300, the disk control manager 228 requests the physical disk resource 226 to insert a shared PR key 230 into the registration table 240 (step 302). This key is not shared among the nodes, but rather indicates that the node that it represents shares read-write access to the disk, along with the owner node and any other nodes. An identifier (e.g., NodeId) of the node is part of this shared PR key 230.

On the owner node, as differentiated via example step 300, step 304 informs the physical disk resource 226 of the cluster node membership data 254. This may be accomplished via a simple bitmask representing the active nodes in the cluster that share the volume, (e.g., typically all nodes, but not necessarily). The physical disk resource 226 passes this membership data 254 to the cluster disk driver 220.

As represented by step 306, when the cluster disk driver 220 on the owner node sees one or more extra keys (other than its own exclusive PR key) in the registration table 240, the cluster disk driver 220 verifies the NodeId of each of those keys against the cluster membership data 254, as represented by step 308. If the key is valid (step 310), the key is allowed to remain in the registration table 240, otherwise it is preempted (step 312). Step 314 repeats the validation for other keys; with an N-node cluster in which each node participates in shared volume access, there are N−1 such shared PR keys.

Figure 4:
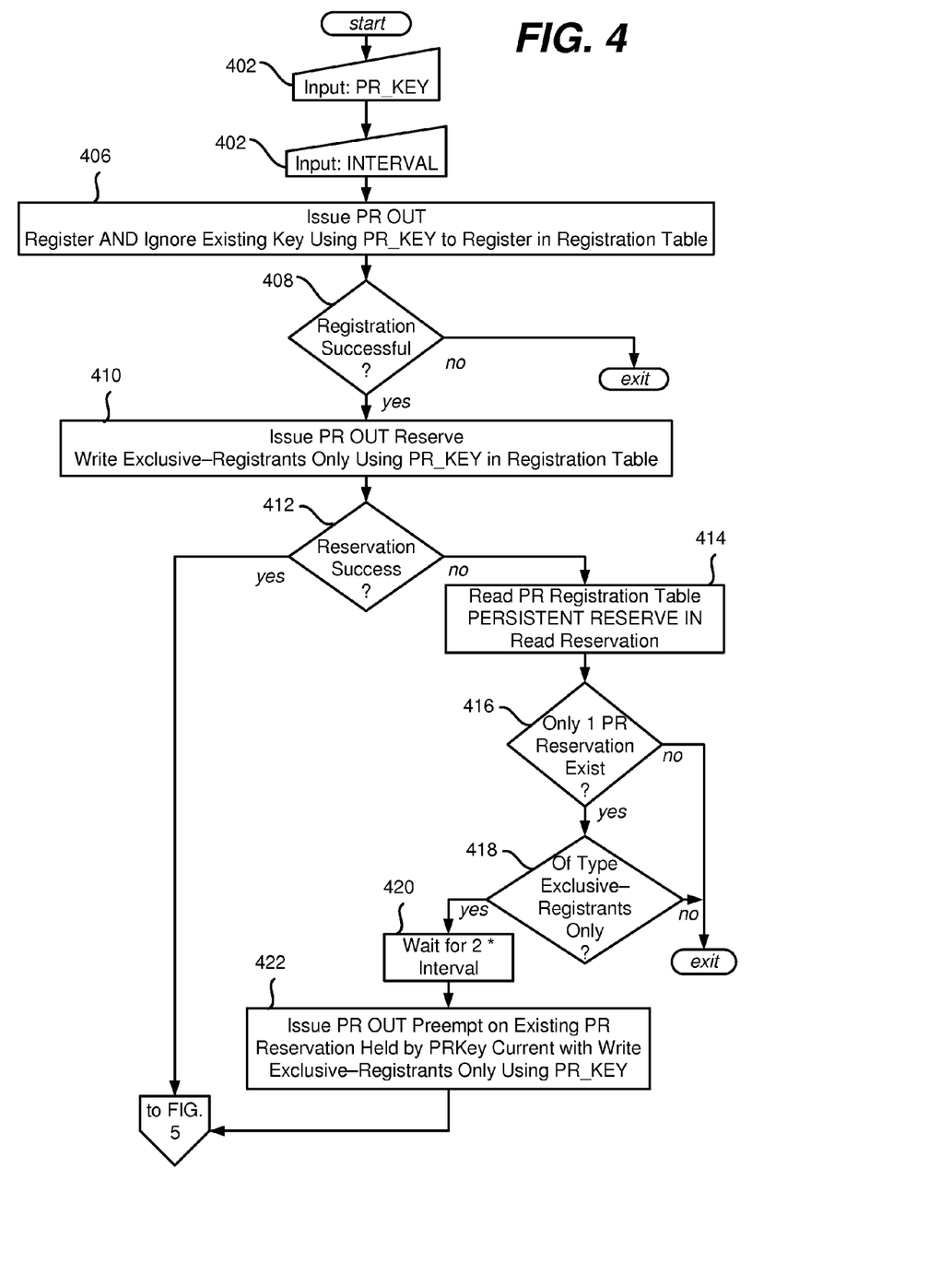
FIGS. 4 and 5 comprise a flow diagram showing example steps taken to in a SCSI-environment to reserve and/or access a cluster shared volume.
Figure 5:
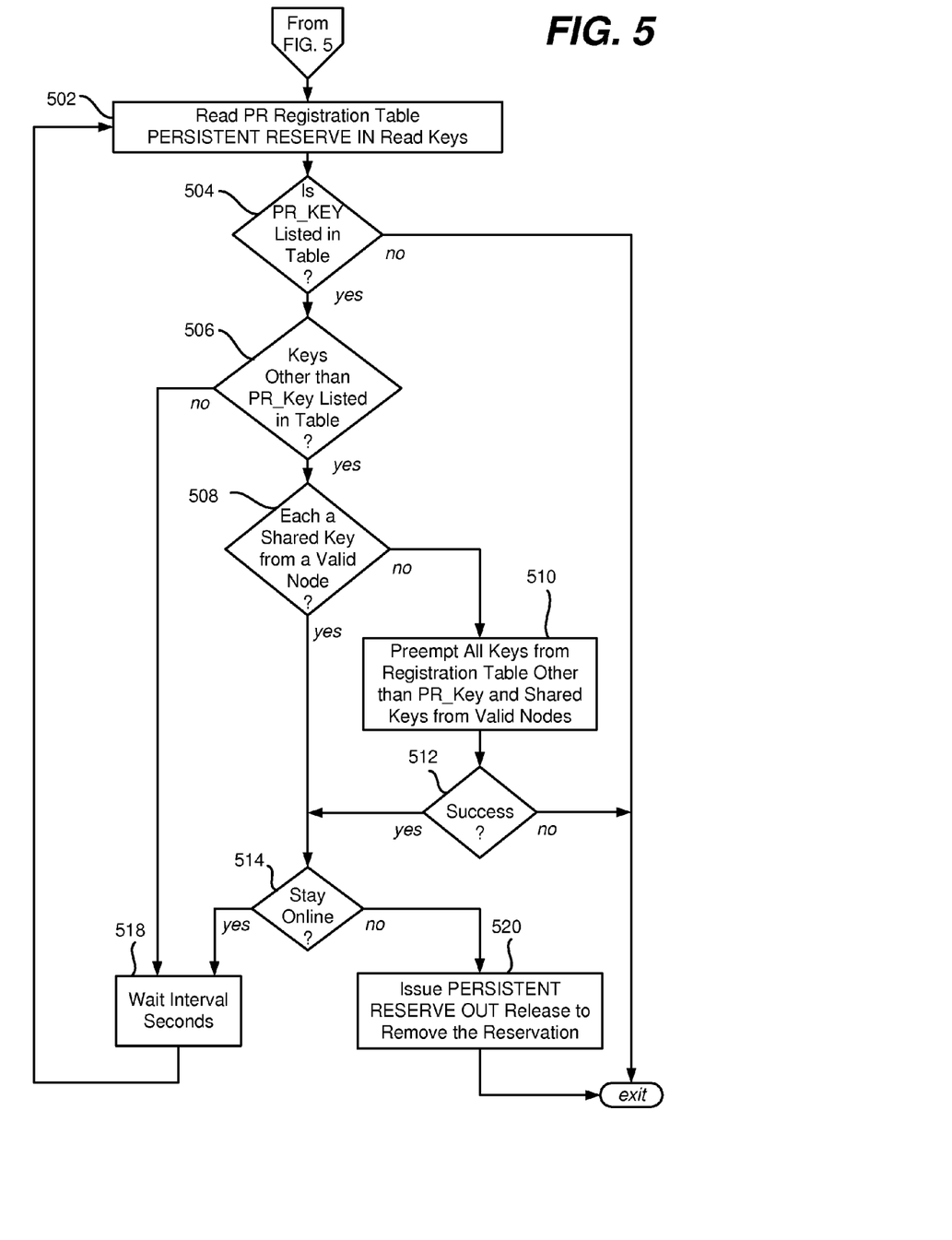

FIGS. 4 and 5 comprise an example flow diagram with additional details for a SCSI-command environment. Steps 402 and 404 are the input to the reservation mechanism of a node, comprising a PR KEY (e.g., comprising a randomly generated number) and a user-configurable interval (with a default value of three seconds, for example).

Step 406 represents attempting registration, which is performed before reservation. If registration is successful (step 408), a reservation attempt is made at step 410. If the reservation is successful, the process advances to FIG. 5 to maintain the reservation, described below. Otherwise the process branches to step 414 to perform persistent reservation arbitration.

Step 414 reads the registration table. If only one PR registration exists, and is of the type exclusive-registrants only, then there is an owner to be challenged by this node; the mechanism waits for two times the interval before challenging ownership. This interval allows the owner node time to defend the challenge. Step 422 corresponds to the challenge.

FIG. 5 represents various maintenance aspects with respect to persistent reservation, if after steps 502 and 504 the node detects its PR key in the registration table. If not listed, then it has been replaced by another node's key, and needs to challenge another time. If no other keys are listed (step 506), then there is no need to defend, and the process ends. Otherwise, the process continues to step 518 to maintain the reservation, as described below.

Step 508 evaluates whether the other keys detected at step 506 are shared keys from valid nodes. If any is not, it is preempted at step 510. This removes the right of disk access of any invalid node. If not successful at step 512, then the node running this process does not have the ability to remove it and ends the process. If successful, the process continues to step 514.

Step 514 represents evaluating whether the node is to stay online and continue operating. Note that a request to end being online may occur at any time from the user mode disk resource, and thus step 514 represents one logical flow. If going offline, step 516 is executed to remove the node's reservation.

Step 518 represents the normal continuing of the process, after waiting for the specified time interval, to ensure that the reservation remains, and to defend the reservation against any challenging reservations.

Exemplary Operating Environment

Figure 6:
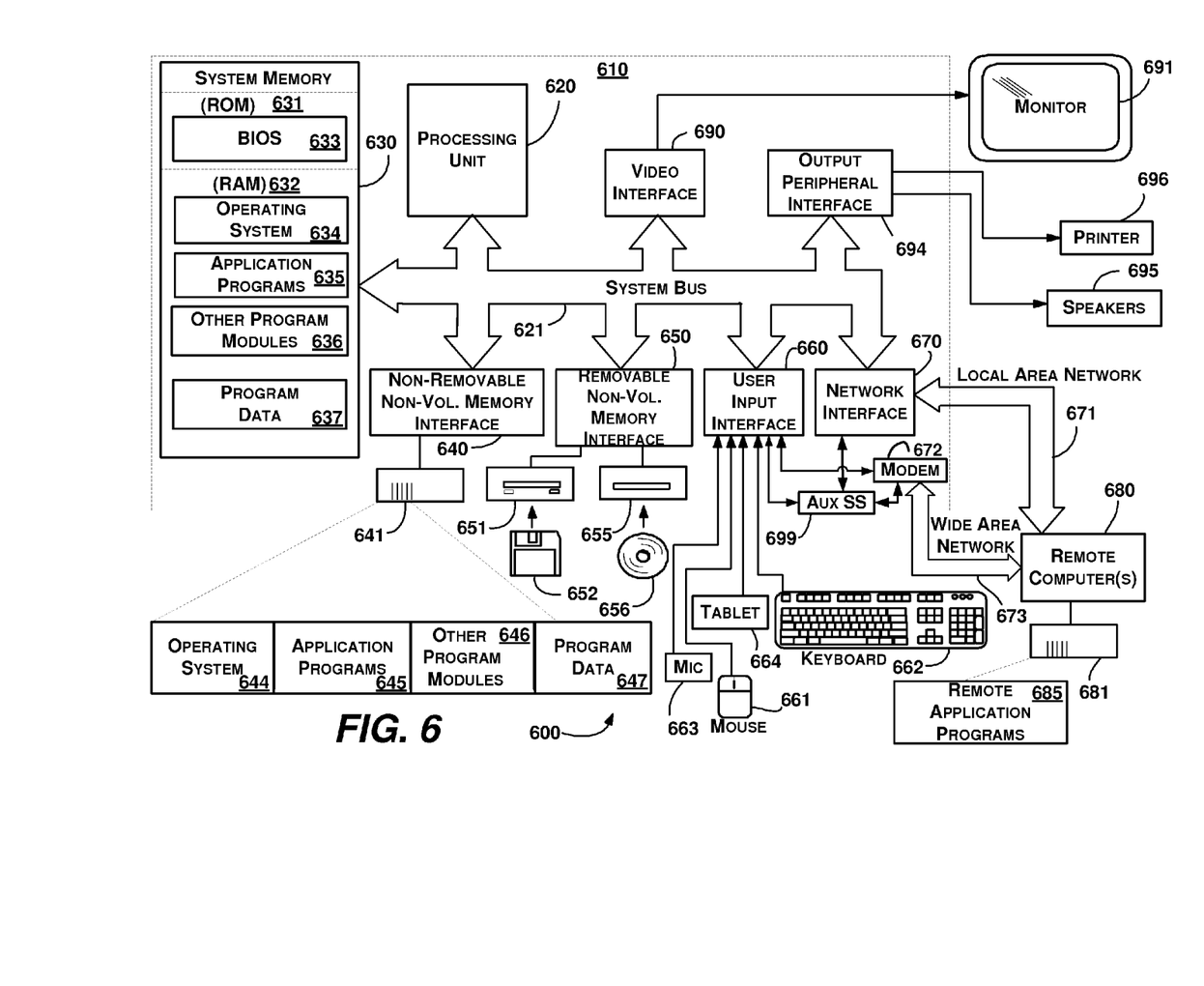
FIG. 6 shows an illustrative example of a computing environment into which various aspects of the present invention may be incorporated.

FIG. 6 illustrates an example of a suitable computing and networking environment 600 on which the examples of FIGS. 1A-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computer storage devices having computer-executable instructions, which upon execution by a computer cause the computer to perform operations comprising:
  associating an owner key that corresponds to an owning node to a registration table associated with a shared storage mechanism;
  storing at least one shared key corresponding to at least one non-owning node in the registration table associated with the shared storage mechanism, the at least one shared key encoded with a node identifier unique to the at least one non-owning node and indicating that the identified at least one non-owning node shares read/write access to the shared storage mechanism with the owning node; and
  validating the at least one shared key against cluster node membership data using the encoded node identifier, wherein validation allows the read/write access to the shared storage mechanism by the at least one non-owning node.

2. The one or more computer storage devices of claim 1, wherein associating the owner key to the registration table comprises writing the owner key into a data structure of the shared storage mechanism.

3. The one or more computer storage devices of claim 1, wherein associating the owner key to the registration table comprises writing the owner key into a data structure of the shared storage mechanism, including by attempting to register the owner key with the shared storage mechanism, and responsive to a successful registration attempt, issuing a reserve command.

4. The one or more computer storage devices of claim 1, wherein the at least one validated shared key corresponding to the at least one non-owning node of the shared storage mechanism is one of a plurality of shared keys stored in the registration table, an individual stored shared key of the plurality of stored shared keys containing an individual node identifier uniquely identifying an individual node in a cluster of nodes, and wherein the cluster membership data identifies individual valid nodes in the cluster of nodes, the individual valid nodes having read/write access to the shared storage mechanism.

5. The one or more computer storage devices of claim 1 having further computer-executable instructions, which on execution by a computer cause the computer to perform operations comprising:
  receiving the cluster membership data that identifies one or more individual valid nodes in a cluster of nodes;
  evaluating a plurality of shared keys stored in the registration table associated with the shared storage mechanism against the received cluster membership data, including individual node identifiers encoded within individual shared keys of the plurality of stored shared keys; and
  preempting one or more stored shared keys that correspond to one or more cluster nodes that are identified as invalid nodes based on the received cluster membership data.

6. The one or more computer storage devices of claim 1 having further computer-executable instructions, which upon execution by a computer cause the computer to perform operations comprising:
  receiving a challenging owner key from the at least one non-owning node at a reservation mechanism of the shared storage mechanism;
  determining whether the owner key remains associated with the shared storage mechanism after a time interval; and
  responsive to a determination that the owner key does not remain associated with the shared storage mechanism after the time interval, associating the challenging owner key to the registration table associated with the shared storage mechanism, the at least one non-owning node becoming the new owning node associated with the shared storage mechanism as the read/write access to the shared storage mechanism is maintained uninterrupted for one or more other valid non-owning nodes during ownership transition.

7. In a server cluster environment, a system comprising:
  a storage device having a registration table storing at least one shared key corresponding to at least one non-owning node; and
  an owner node that associates an owner key with the registration table of the storage device to maintain ownership of the storage device, and evaluates shared keys stored in the registration table of the storage device to allow read/write access to the storage device by non-owning nodes having validated stored shared keys, including extracting a node identifier encoded in the at least one stored shared key, and comparing the extracted node identifier against cluster membership data to validate the at least one stored shared key, the owner node maintaining the validated stored shared keys in the registration table and removing invalidated stored shared keys from the registration table.

8. The system of claim 7, wherein the owner node evaluates a challenging owner key associated with the registration table of the storage device and removes the challenging owner key from the registration table to maintain ownership of the storage device.

9. The system of claim 7 further comprising:
  a reservation mechanism, implemented on the owner node, that issues a reserve command to the storage device in response to a successful attempt by the owner node to register the owner key with the registration table of the storage device.

10. The system of claim 9, wherein the reservation mechanism challenges ownership of the storage device in response to an unsuccessful reservation attempt.

11. The system of claim 7, wherein the owner node retains control of the storage device and allows simultaneous read/write access by non-owning nodes in a cluster of nodes on a per-node basis using the shared keys and the cluster membership data.

12. The system of claim 7, wherein the owner node determines whether the owner key remains associated with the registration table of the storage device after a time interval, and in response to a determination that the owner key does not remain associated with the registration table of the storage device after the time interval, re-associates the owner key with the registration table of the storage device.

13. A method comprising:
  associating, by a computing device, an owner key that corresponds to an owning node with a registration table that corresponds to a shared storage mechanism;
  storing, in the registration table that corresponds to the shared storage mechanism, at least one shared key corresponding to at least one non-owning node, the at least one shared key encoded with a node identifier unique to the at least one non-owning node; and
  validating the at least one shared key against cluster node membership data using the encoded node identifier, the validation allowing read/write access to the shared storage mechanism by the at least one non-owning node.

14. The method of claim 13, wherein associating the owner key comprises writing the owner key into a data structure of the shared storage mechanism.

15. The method of claim 13, wherein associating the owner key comprises writing the owner key into a data structure of the shared storage mechanism, including by attempting to register the owner key with the shared storage mechanism, and responsive to a successful registration attempt, issuing a reserve command.

16. The method of claim 13, wherein the at least one validated shared key corresponding to the at least one non-owning node of the shared storage mechanism is one of a plurality of shared keys stored in the registration table, an individual stored shared key of the plurality of stored shared keys containing an individual node identifier uniquely identifying an individual node in a cluster of nodes, and wherein the cluster membership data identifies individual valid nodes in the cluster of nodes, the individual valid nodes having read/write access to the shared storage mechanism.

17. The method of claim 13 further comprising:
receiving, by the computing device, the cluster membership data that identifies one or more individual valid nodes in a cluster of nodes;
evaluating, by the computing device, a plurality of shared keys stored in the registration table that corresponds to the shared storage mechanism against the received cluster membership data, including individual node identifiers encoded within individual shared keys; and
preempting, by the computing device, one or more stored shared keys that correspond to one or more cluster nodes that are identified as invalid nodes based on the received cluster membership data.

18. The method of claim 13, further comprising:
receiving a challenging owner key from the at least one non-owning node at a reservation mechanism of the shared storage mechanism;
determining, by the computing device, whether the owner key remains associated with the shared storage mechanism after a time interval; and
responsive to a determination that the owner key does not remain associated with the shared storage mechanism after the time interval, associating the challenging owner key to the registration table that corresponds to the shared storage mechanism, the at least one non-owning node becoming the new owning node associated with the shared storage mechanism as the read/write access to the shared storage mechanism is maintained uninterrupted for one or more other valid non-owning nodes during ownership transition.

* * * * *